United States Patent
Alkhawaja

(10) Patent No.: US 11,570,246 B1
(45) Date of Patent: Jan. 31, 2023

(54) LAYER 7 HEALTH CHECK AUTOMATED EXECUTION FRAMEWORK

(71) Applicant: SAUDI ARABIAN OIL COMPANY, Dhahran (SA)

(72) Inventor: Aqeel Hussain Alkhawaja, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/455,362

(22) Filed: Nov. 17, 2021

(51) Int. Cl.
*G06F 11/20* (2006.01)
*H04L 67/1095* (2022.01)
*H04L 67/02* (2022.01)
*H04L 41/0663* (2022.01)
*G06F 11/16* (2006.01)

(52) U.S. Cl.
CPC ...... *H04L 67/1095* (2013.01); *G06F 11/1658* (2013.01); *H04L 41/0663* (2013.01); *H04L 67/02* (2013.01)

(58) Field of Classification Search
CPC ............. H04L 41/0663; H04L 67/1031; H04L 67/1034; H04L 43/12; H04L 43/20; G06F 11/2097; G06F 11/2025; G06F 2201/80; G06F 11/2023; G06F 11/2082; G06F 11/2074; G06F 11/2076; G06F 16/273; G06F 11/1658
See application file for complete search history.

(56) References Cited

U.S. PATENT DOCUMENTS

| | | | |
|---|---|---|---|
| 7,441,045 B2 | 10/2008 | Skene et al. | |
| 7,505,401 B2 | 3/2009 | Kashyap | |
| 8,015,298 B2 | 9/2011 | Yevmenkin et al. | |
| 8,181,071 B2 | 5/2012 | Cahill et al. | |
| 8,689,311 B2 | 4/2014 | Blinn et al. | |
| 9,137,165 B2 | 9/2015 | Anand et al. | |
| 9,185,158 B2 | 11/2015 | Wang et al. | |
| 9,264,296 B2 | 2/2016 | Maldaner | |
| 9,268,656 B2 | 2/2016 | Hopen et al. | |
| 9,432,426 B2 | 8/2016 | Mao et al. | |
| 10,609,189 B2 | 3/2020 | Patil | |
| 2006/0064478 A1 | 3/2006 | Sirkin | |
| 2009/0245113 A1 | 10/2009 | Kamiya | |

(Continued)

*Primary Examiner* — Chirag R Patel
(74) *Attorney, Agent, or Firm* — Osha Bergman Watanabe & Burton LLP

(57) ABSTRACT

A method, computer readable medium, and computer network are provided for performing a synchronization operation. The method may comprise retrieving a list of network addresses of all standby servers in a standby server pool. The method may further include, using the list of network addresses, sending a health check query to each standby server in the standby server pool, and receiving response messages from the standby servers in the standby server pool. A positive response may indicate that the standby server is active in the standby server pool, and a negative response may indicate that the standby server is inactive in the standby server pool. The method may include, when any standby server returns the positive response, sending a message to an administrator. The method may further include, when every standby server returns the negative response, initiating a synchronization operation on a standby database connected to the standby servers.

18 Claims, 8 Drawing Sheets

(56) References Cited

U.S. PATENT DOCUMENTS

| | | | |
|---|---|---|---|
| 2014/0067983 A1* | 3/2014 | Gabriel | H04L 49/356 709/208 |
| 2014/0095688 A1* | 4/2014 | O'Connor | H04L 43/0817 709/224 |
| 2014/0095925 A1* | 4/2014 | Wilson | G06F 11/2038 714/E11.089 |
| 2015/0178137 A1* | 6/2015 | Gordon | G06F 9/5061 709/226 |
| 2019/0102421 A1* | 4/2019 | Sonawane | G06F 11/2048 |
| 2020/0192772 A1* | 6/2020 | Asveren | G06F 11/2023 |
| 2021/0089415 A1* | 3/2021 | Kumar | G06F 11/2023 |
| 2021/0136143 A1* | 5/2021 | Nguyen | G06F 16/9566 |

* cited by examiner

LAYER 7 HEALTH CHECK AUTOMATED EXECUTION FRAMEWORK

BACKGROUND

In computer networks it is common to have backup servers that provide a level of failover recovery in the event that production servers go down. The backup servers may be provided on the network in parallel with the productions servers in order to facilitate easily switching between the production servers and the backup servers during a failure. Further, both backup and production servers may be used simultaneously in a load balancing set in order to distribute the workload amongst all available resources. In such an environment, network requests are evenly distributed between production and backup servers to prevent any individual server from becoming bogged down with too many requests. It is important that the backup servers always be kept up to date with the most current information available on the production servers. If the backup servers are not kept up to date then client requests may be served with old or out of date information. One way to keep backup servers up to date is to synchronize them with the production servers as part of routine maintenance. A problem with synchronization is that it must be done without interrupting the normal flow of network traffic. Synchronization procedures can use a significant amount of bandwidth, so it may be beneficial to schedule synchronization jobs when the network is down on the backup servers. It is an object of the present invention to provide a solution to the problem of performing synchronization jobs between backup and production servers.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method, computer-readable medium, and computer network for performing a synchronization operation.

In one embodiment, a method is provided for performing a synchronization operation. The method may comprise retrieving a list of network addresses of all standby servers in a standby server pool. The method may further include, using the list of network addresses, sending a health check query to each standby server in the standby server pool, and receiving response messages from the standby servers in the standby server pool. In some embodiments a positive response from a standby server indicates that the standby server is active in the standby server pool, and a negative response from a standby server indicates that the standby server is inactive in the standby server pool. Next, the method may include, when any standby server returns the positive response, sending a message to a system administrator indicating every server that returns the positive response. The method may further include, when every standby server returns the negative response, initiating a synchronization operation on a standby database connected to the standby servers.

In one or more embodiments of the method, the health check query comprises an HTTP GET request.

In one or more embodiments of the method, the positive response is an HTTP 200 OK response and the negative response is an HTTP 404 Not Found response.

In one or more embodiments of the method, the list of network addresses comprises a list of internet protocol (IP) network addresses that are associated with a load balancer having a virtual internet protocol (VIP) address.

In one or more embodiments of the method, the synchronization operation comprises synchronizing data between the standby database and a production database.

In one or more embodiments of the method, when a standby server does not respond to the health check query within a predetermined amount of time, the standby server that does not respond is automatically determined to have returned the negative response.

In one embodiment, a non-transitory computer-readable storage medium is provided. The non-transitory computer-readable storage medium may have computer-readable instructions stored thereon, which when executed by a computer cause the computer to perform one or more operations. The operations may comprise retrieving a list of network addresses of all standby servers in a standby server pool. The operations may further include, using the list of network addresses, sending a health check query to each standby server in the standby server pool, and receiving response messages from the standby servers in the standby server pool. In some embodiments a positive response from a standby server indicates that the standby server is active in the standby server pool, and a negative response from a standby server indicates that the standby server is inactive in the standby server pool. Next, the operations may include, when any standby server returns the positive response, sending a message to a system administrator indicating every server that returns the positive response. The operations may further include, when every standby server returns the negative response, initiating a synchronization operation on a standby database connected to the standby servers.

In one or more embodiments of the computer-readable medium, the health check query comprises an HTTP GET request.

In one or more embodiments of the computer-readable medium, the positive response is an HTTP 200 OK response and the negative response is an HTTP 404 Not Found response.

In one or more embodiments of the computer-readable medium, the list of network addresses comprises a list of internet protocol (IP) network addresses that are associated with a load balancer having a virtual internet protocol (VIP) address.

In one or more embodiments of the computer-readable medium, the synchronization operation comprises synchronizing data between the standby database and a production database.

In one or more embodiments of the computer-readable medium, when a standby server does not respond to the health check query within a predetermined amount of time, the standby server that does not respond is automatically determined to have returned the negative response.

In one embodiment, a computer network is provided for performing a synchronization operation. The computer network may comprise at least one first computer and one or more standby servers in a standby server pool. The first computer may be configured to retrieve a list of network addresses of all standby servers in a standby server pool. The first computer may be further configured to, using the list of network addresses, send a health check query to each standby server in the standby server pool, and receive response messages from the standby servers in the standby server pool. In some embodiments a positive response from a standby server indicates that the standby server is active in the standby server pool, and a negative response from a standby server indicates that the standby server is inactive in the standby server pool. Next, the first computer may be further configured to, when any standby server returns the positive response, send a message to a system administrator indicating every server that returns the positive response. The first computer may be further configured to, when every standby server returns the negative response, initiate a synchronization operation on a standby database connected to the standby servers.

In one or more embodiments of the computer network, the health check query comprises an HTTP GET request.

In one or more embodiments of the computer network, the positive response is an HTTP 200 OK response and the negative response is an HTTP 404 Not Found response.

In one or more embodiments of the computer network, the list of network addresses comprises a list of internet protocol (IP) network addresses that are associated with a load balancer having a virtual internet protocol (VIP) address.

In one or more embodiments of the computer network, the synchronization operation comprises synchronizing data between the standby database and a production database.

In one or more embodiments of the computer network, when a standby server does not respond to the health check query within a predetermined amount of time, the standby server that does not respond is automatically determined to have returned the negative response.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although various embodiments may be described with respect to a system, a non-transitory computer-readable medium, and a method, it is contemplated that embodiments with identical or substantially similar features may alternatively be implemented as methods, systems, and/or non-transitory computer-readable media.

In general, embodiments of the disclosure include systems and methods for an automated execution framework designed to overcome human-mistakes and time consumption dilemmas by making intelligent decisions to execute a synchronization job on an active standby system on any desired time based on a virtual IP load balancer that has L7 (Layer 7) health check. L7 health check depends on the availability of a health check page on standby application servers which indicates if the active standby system is included in the virtual IP or serving users. In other words, the embodiments disclosed herein validate if the standby application servers are disabled from the load balancer virtual IP to ensure the system is not used prior to executing a schedule downtime job. One or more embodiments disclosed herein apply to the scenario in which there is no user data stored in the database, only application and frameworks data. Further, for embodiments disclosed herein, both landscapes production and standby are part of the same virtual IP address used for load balancing.

Figure 1:
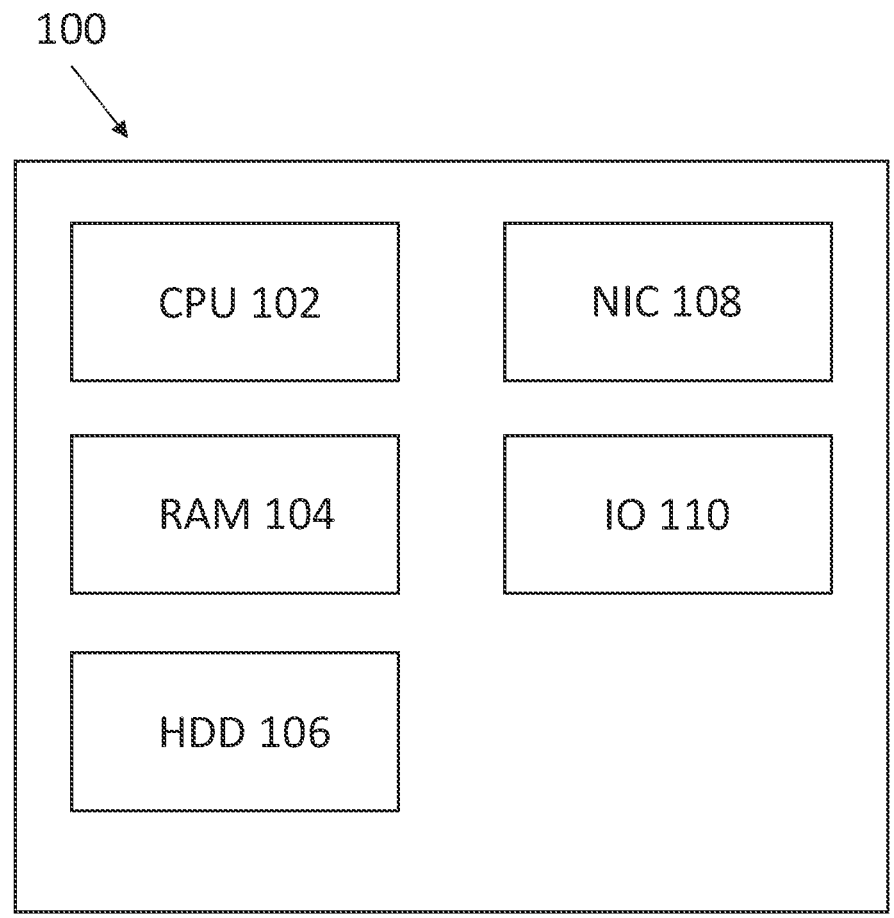
FIG. 1 shows a computer server in accordance with one or more embodiments.

FIG. 1 shows server 100 according to some embodiments. Server 100 may include one or more modules 102-110 that facilitate operations of the server. Server 100 may utilize one or more open-source or closed-source database or server technologies. Example open-source server technologies include MySQL, Apache, and Linux server. Example closed-source server technologies include Microsoft Windows Server©, Oracle DBMS©, IBM Db2©, and SAP Server©. These and other technologies may be used by the present invention. Server 100 may include one or more central processing units (CPUs) 102 to facilitate task execution. CPUs 102 may include one or more x86 architecture CPUs, such as those provided by Intel© and/or AMD©. Server 100 may also include one or more random access memory modules (RAMs) 104 for storing data and programs that are actively being used by server 100. For long-term storage, server 100 may implement one or more hard disk drives (HDDs) 106 that permanently store data and programs necessary for the functioning of the server. HDDs 106 may include traditional storage technology such as rotating magnetic platters that are accessed by one or more electromagnetic heads, or, HDDs 106 may include newer solid state disks (SSDs) that store information in flash memory, such as NAND flash and/or NOR flash. HDDs 106 may employ any number of long-term storage transfer protocols, such as Parallel ATA (PATA), Serial ATA (SATA), and/or Small Computer System Interface (SCSI). Server 100 may also include one or more network interface cards (NICs) 108 for accessing other computers or resources over a network. Server 100 may further include input-output module (IO) 110 for humans interfacing with server 100. IO 110 may include an interface to any number of input and output devices, such as pointing devices, keyboards, video displays, and the like. It will be appreciated that server 100 may be configured any number of ways without departing from the spirit and scope of the invention.

Figure 2:
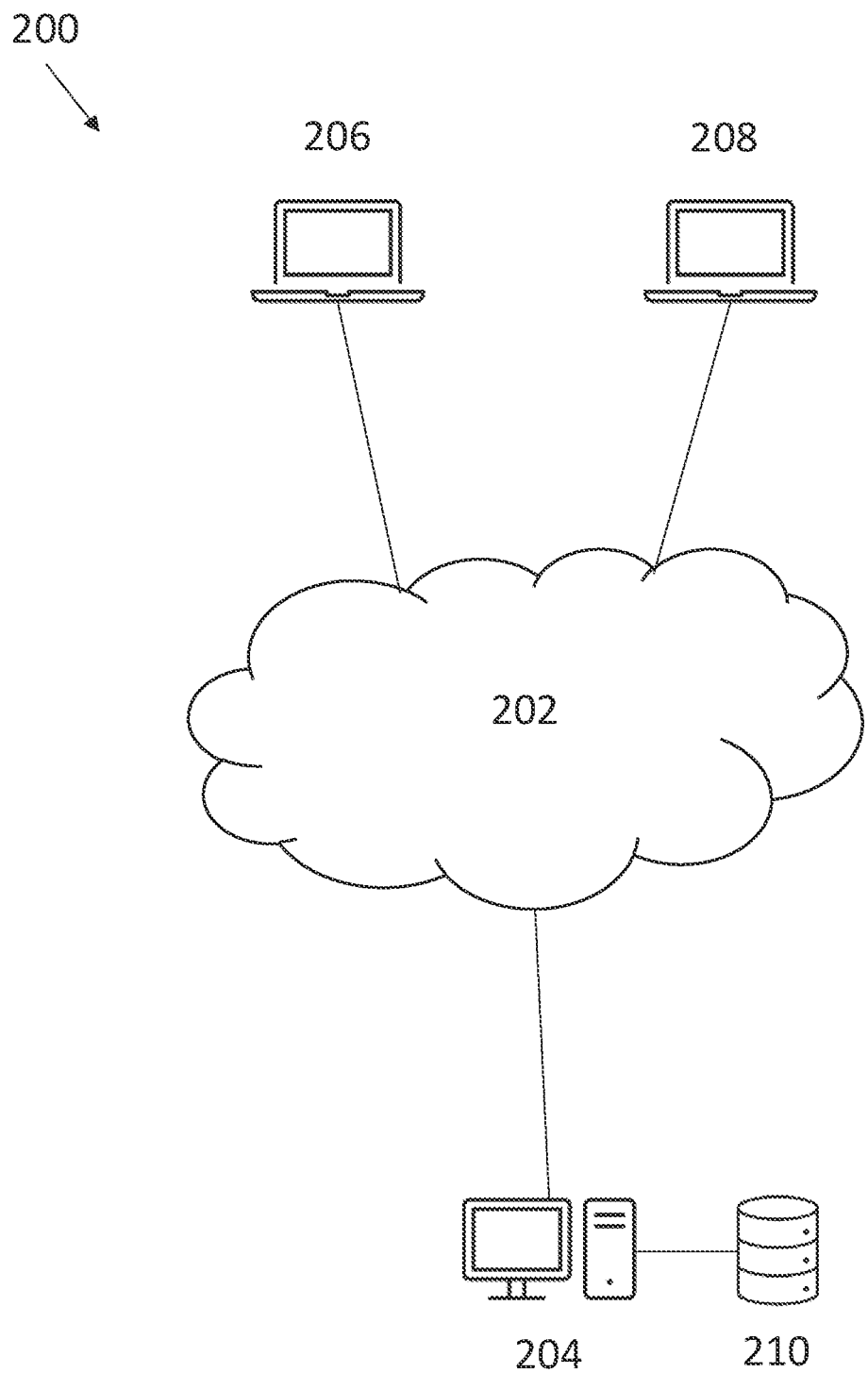
FIG. 2 shows a network in accordance with one or more embodiments.

FIG. 2 shows a computer network 200. Computer network 200 may include a number of devices 202-210. Server 204 may be similar in constitution to server 100 provided in FIG. 1. Clients 206 and 208 may be computer systems that allow human users to access resources on network 200, including server 204. As will be understood by one having skill in the art, clients 206 and 208 may also include various modules to facilitate their functioning, such as CPU, RAM, HDD, and IO. Infrastructure 202 may be provided to interconnect all of the devices on the network 200. Infrastructure 202 may include any number of switches, routers, firewalls, and other essential network elements that support communications among and between devices 204-210. In one or more embodiments, infrastructure 202 may include the Internet.

In the ordinary functioning of network 200, clients 206 and 208 may submit requests that are fulfilled by server 204. For example, as discussed above, server 204 may include an Apache web server providing hyper text transfer protocol (HTTP) services for clients 206 and 208. As such, clients 206 and 208 may type in a web address on their web browsers that is subsequently directed to server 204, which is responsible for fulfilling the request by providing a web page, for example. The web address may include a uniform resource locator (URL), and the request may traverse multiple layers of networking protocols in order to be fulfilled. For example, domain name services (DNS) may convert the URL into a layer 3 Internet protocol (IP) address, which infrastructure 202 may use to route packets to and from server 204. Further, clients 206 and 208 may establish a layer 4 session with server 204 using one or more of transmission control protocol (TCP) and/or user datagram protocol (UDP). Any number of protocols may be used on network 200 to facilitate communication between devices 204-210, as will be appreciated by one having ordinary skill in the art. Further, server 204 may be connected to a database 210 that aids in fulfilling requests sent from clients 206 and 208. For example, database 210 may contain one or more HTML web pages and/or one or more database objects, such as tables or indices. After receiving a request from clients 206 and 208, server 204 may access database 210 to retrieve the appropriate content, such as HTML pages and/or database objects. Next, server 204 provides the retrieved content to the one or more of clients 206 and 208 that sent the request.

Figure 3:
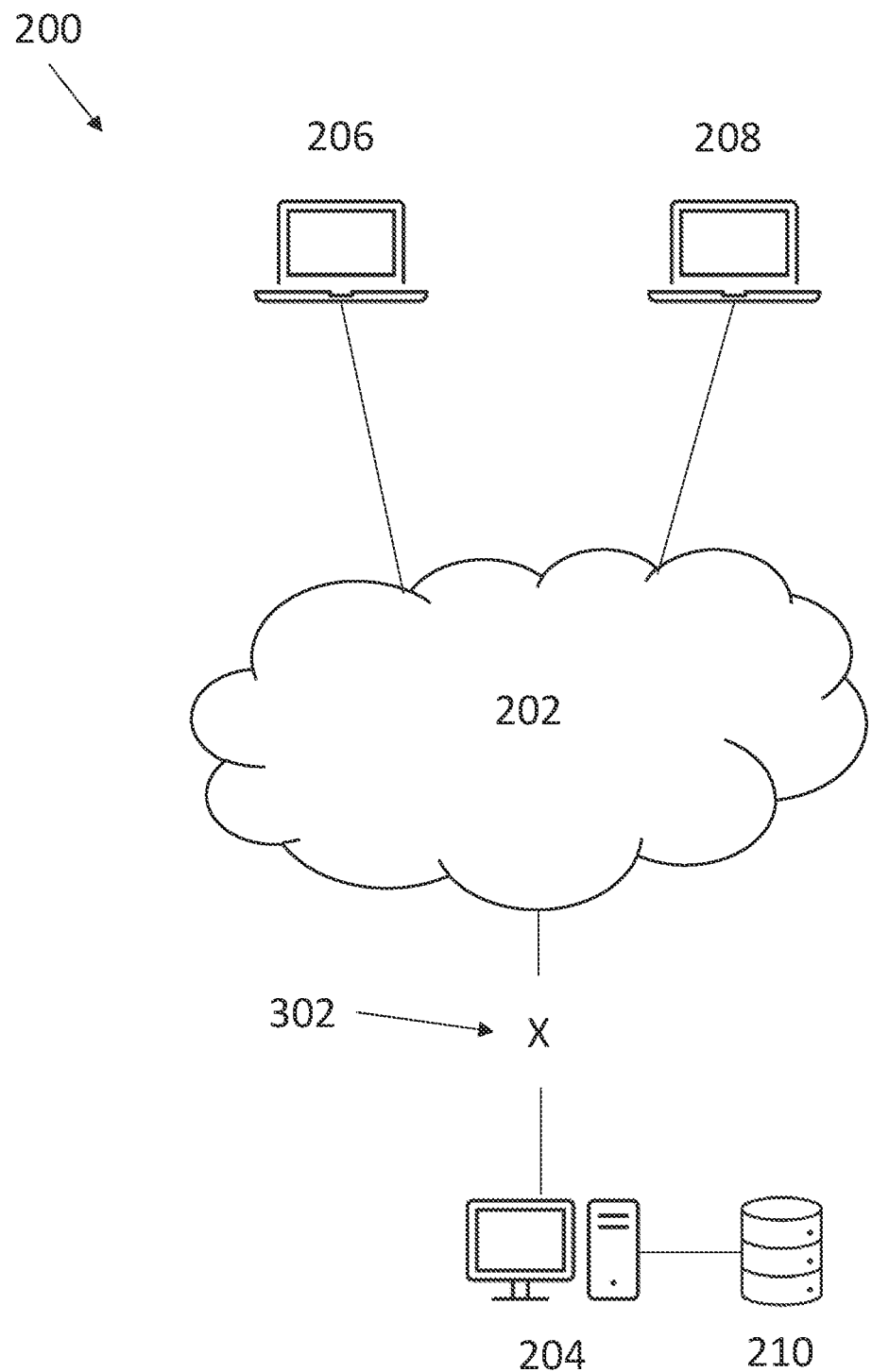
FIG. 3 shows a network with a connection failure in accordance with one or more embodiments.

FIG. 3 shows computer network 200 during a connection failure. Connection failure, illustrated by "X" 302 may occur at any time, which interrupts communications between clients 206, 208 and server 204. During such a failure, HTTP requests and other requests sent by clients 206 and 208 will not be able to be fulfilled by server 204. This type of failure on network 200 reduces productivity, since clients 206, 208 must wait for connection failure 302 to be fixed before submitting requests again. If network 200 is a corporate or enterprise network, then significant financial damage may be incurred by the loss of productivity.

Figure 4:
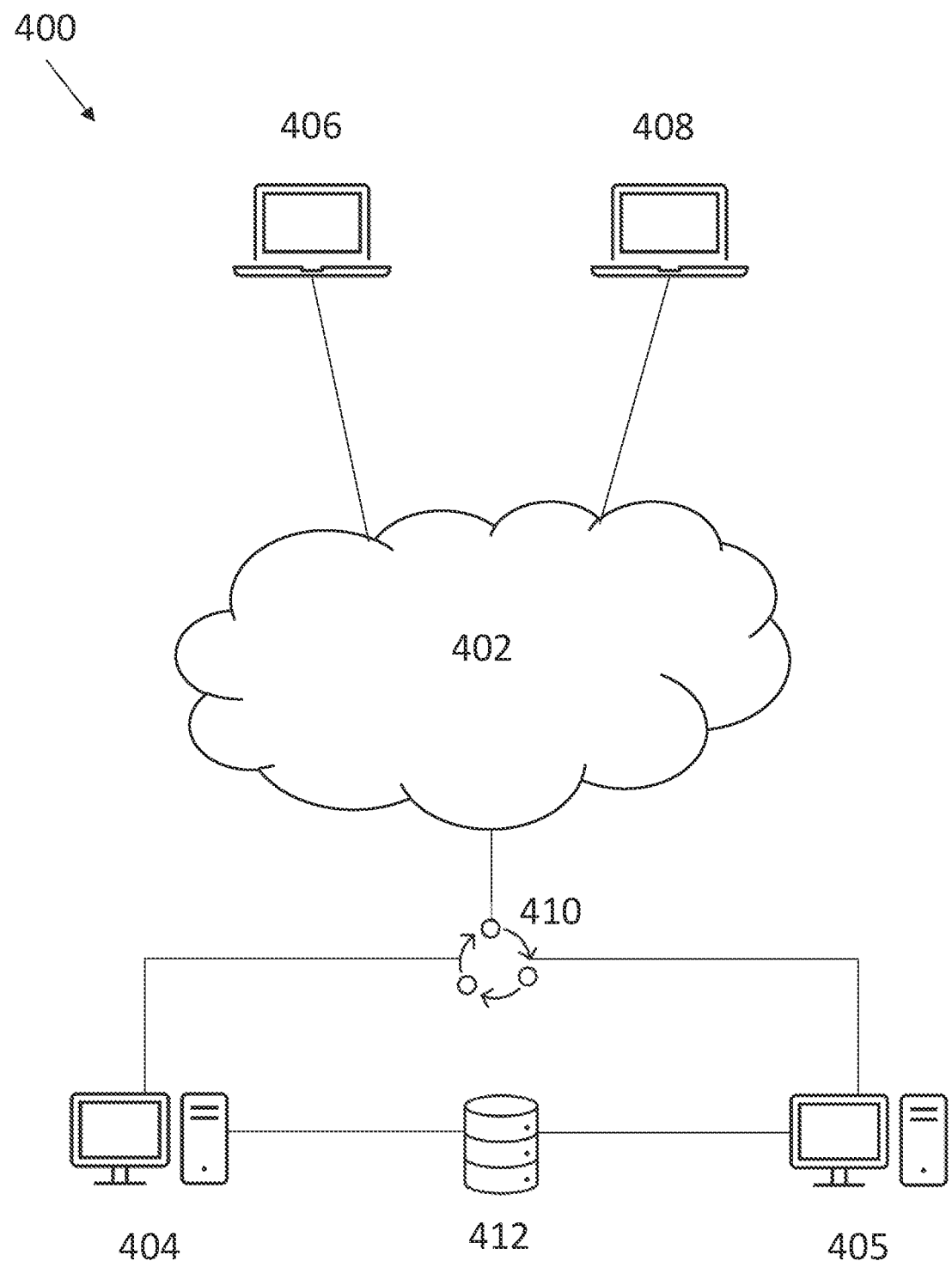
FIG. 4 shows a redundant network in accordance with one or more embodiments.

FIG. 4 shows a redundant network 400 according to some embodiments of the invention. Redundant network 400 may include a number of similar devices to network 200, such as infrastructure 402, and clients 406, 408. However, redundant network 400 has the advantage of including multiple servers 404, 405 for supporting clients 406, 408. It will be appreciated that redundant network 400 may include any number of clients 406, 408 and servers 404, 405 without departing from the spirit and scope of the invention. The advantage of including multiple servers in redundant network 400 is that a connection failure to any one of servers 404, 405 will not interrupt the services being accessed by clients 406, 408. One key aspect of redundant network 400 is the addition of load balancer 410 for communicating between infrastructure 402 and servers 404, 405. As will be understood by one having skill in the art, load balancer 410 may also include various modules to facilitate its functioning, such as CPU, RAM, HDD, and IO. Load balancer 410 may also implement any number of protocols to facilitate communication on network 400. In one embodiment, load balancer 410 supports virtual internet protocol (VIP) addressing. The VIP protocol allows the load balancer 410 to present clients 406, 408 with a single VIP address for accessing network resources, such as the above-mentioned Apache HTTP resources. In order to access resources, clients 406, 408 simply send a request to the single VIP address provided by load balancer 410. When a request is received at load balancer 410, the load balancer 410 will forward the request to an IP address that specifies one of servers 404 and 405. Servers 404 and 405 each have their own unique IP address, but the clients 406 and 408 may be unaware of this and only need to remember the VIP address provided by the load balancer 410.

Load balancer 410 may include any number of methods for routing requests from the VIP address to servers 404, 405. In one embodiment, load balancer 410 evenly distributes requests among servers 404 and 405. For example, load balancer 410 may send a first request to server 404, a second request to server 405, a third request to server 404, and so on. Load balancer 410 may continue this way, alternating requests between servers 404, 405 in order to create an even distribution. In some embodiments, servers 404 and 405 may not be equal in processing power. In such a case, load balancer 410 may distribute requests equitably among servers 404 and 405 according to their processing ability. In another embodiment, load balancer 410 may distribute requests based on an amount of traffic load on each of servers 404 and 405. Servers 404 and 405 may both be connected to a database 412 that aids in fulfilling requests sent from clients 406 and 408. Similar to database 210, database 412 may contain one or more HTML web pages and/or one or more database objects, such as tables or indices. After one or more of servers 404 and 405 receives a request from clients 406 and 408, the one or more of servers 404 and 405 that received the request may access database 412 to retrieve the appropriate content, such as HTML pages and/or database objects. Next, the one or more of servers 404 and 405 that received the request provides the retrieved content to the one or more of clients 206 and 208 that sent the request.

Figure 5:
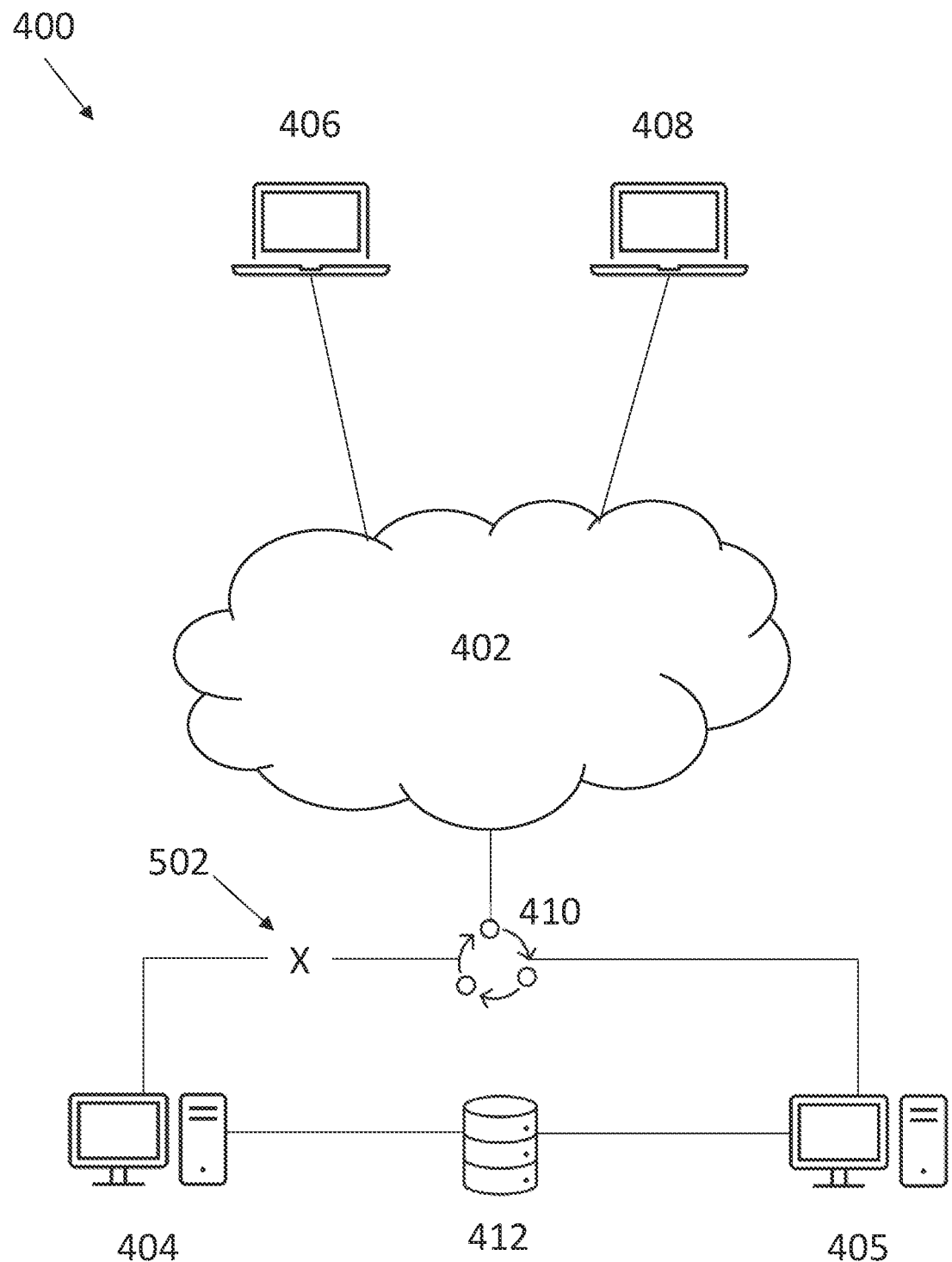
FIG. 5 shows a redundant network with a connection failure in accordance with one or more embodiments.

FIG. 5 shows redundant network 400 experiencing a network failure 502. A benefit of redundant network 400 is that during connection failure 502 at server 404, services are not disrupted to clients 406 and 408. That is, load balancer 410 automatically senses failure 502 and subsequently routes all requests to server 405. For example, after noticing failure 502 and upon receiving a new request at the VIP address, load balancer 410 may route the new request and all new requests to the unique IP address identifying server 405. Once connection failure 502 to server 404 is fixed, load balancer 410 may resume distributing requests among both of servers 404 and 405.

In one embodiment, load balancer 410 may avoid routing requests to one of servers 404, 405 even in the absence of a failure 502. This type of operation may be implemented in order to provide one of servers 404 and 405 as a standby server. In this context, a standby server refers to a server that is not down, is functioning normally, and is ready to be put into use at a moment's notice in the event of a failure at the other one of servers 404, 405 that is currently in production. For example, still referring to FIG. 5, load balancer 410 in one embodiment may be routing all requests to server 404 and keeping server 405 as a standby server, without currently routing requests thereto. Once the failure 502 occurs to server 404, then load balancer 410 shifts the routing of all requests from server 404 to standby server 405. In similar fashion to FIG. 4, servers 404 and 405 may both be connected to database 412 that aids in fulfilling requests sent from clients 406 and 408. Since both of servers 404 and 405 are connected to database 412, connection failure 502 does not disrupt the ability of clients 406 and 408 to access content on database 412. For example, prior to connection failure 502, server 404 may be accessing database 412 to service requests sent from clients 406 and 408. Subsequent to connection failure 502, server 405 may access database 412 to service requests sent from clients 406 and 408. In this way, servers 404 and 405 provide a dual path to database 412.

Figure 6:
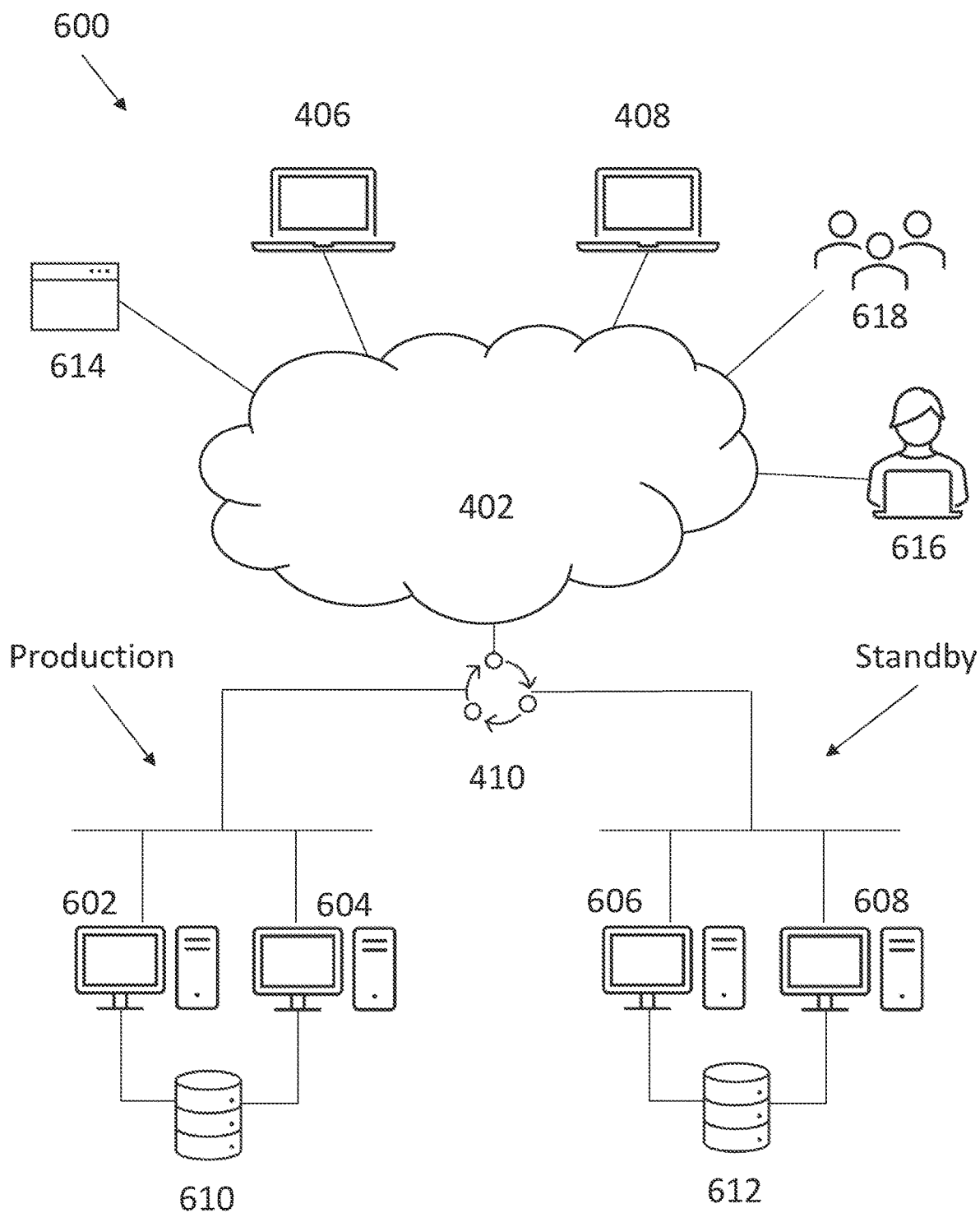
FIG. 6 shows a redundant network with multiple standby servers in accordance with one or more embodiments.

Attention is now turned to FIG. 6, which shows a redundant network 600 according to another embodiment. In redundant network 600, servers 602-608 are provided for serving clients 406 and 408. As described in FIG. 5 above, some of servers 602-608 may be provided as standby servers, and some may be provided as production servers. In one embodiment, servers 602 and 604 are provided as production servers, and servers 606 and 608 are provided as standby servers. As described in FIG. 5 above, if a network failure occurs at any one of production servers 602 or 604, then load balancer 410 may route requests to one or more of standby servers 606, 608 in order to avoid disrupting services to clients 406, 408. In one embodiment, load balancer 410 starts routing requests to one or more of standby servers 606 and 608 when only one of production servers 602 or 604 experiences a connection failure. In another embodiment, load balancer 410 only starts routing requests to one of standby servers 606, 608 when both or all of production servers 602 and 604 are experiencing a connection failure.

A challenge associated with redundant network 600 is that standby database 612 must be kept current in terms of data synchronization between itself and production database 610. For example, during a failure when requests are re-routed from one or more of production servers 602, 604 to standby servers 606, 608, the data stored on both databases must match so that services to clients 406 and 408 are not interrupted or presented with stale data when re-routing occurs. This means that all updates occurring on production database 610 must eventually be propagated to standby database 612. As discussed above, if production servers 602 and 604 are Apache web servers, and there are daily or monthly updates occurring to the web pages stored on production database 610 that they serve, these updates must be copied over to standby database 612 on a regular basis so that the updates are also made available to clients 406 and 408 during re-routing after a failover. Scheduling tool 614, system administrators 616, and authorized users 618 may further be disposed on redundant network 600 in order to assist with synchronization operations, which will be discussed in further detail below.

The challenge of synchronizing data between production database 610 and standby database 612 is exacerbated by the fact that any number of servers 602-608 may be serving clients via the databases when a synchronization operation occurs. Such synchronization operations may necessitate the use of significant resources and bandwidth between production servers 602, 604 and standby servers 606, 608. For this reason, it may be beneficial to ensure that standby servers 606 and 608 are not currently serving clients at a time when the synchronization operation occurs. If a synchronization operation occurs at standby servers 606, 608 at a time when one of them is communicating with clients, then the clients' service may be diminished or completely disrupted by the demanding synchronization operation. It will be appreciated that a procedure is needed for confirming that standby servers 606 and 608 are not currently serving clients before a synchronization operation occurs.

Ordinarily, it is the job of system administrators 616 to manually check and ensure that standby servers 606 and 608 are not currently serving customer before initiating a synchronization operation. Unfortunately, such a manual procedure is fraught with errors, such as system administrators 616 mistyping an address of a standby server or simply missing a server on their list in an instance where there are many servers that must be checked.

Figure 7:
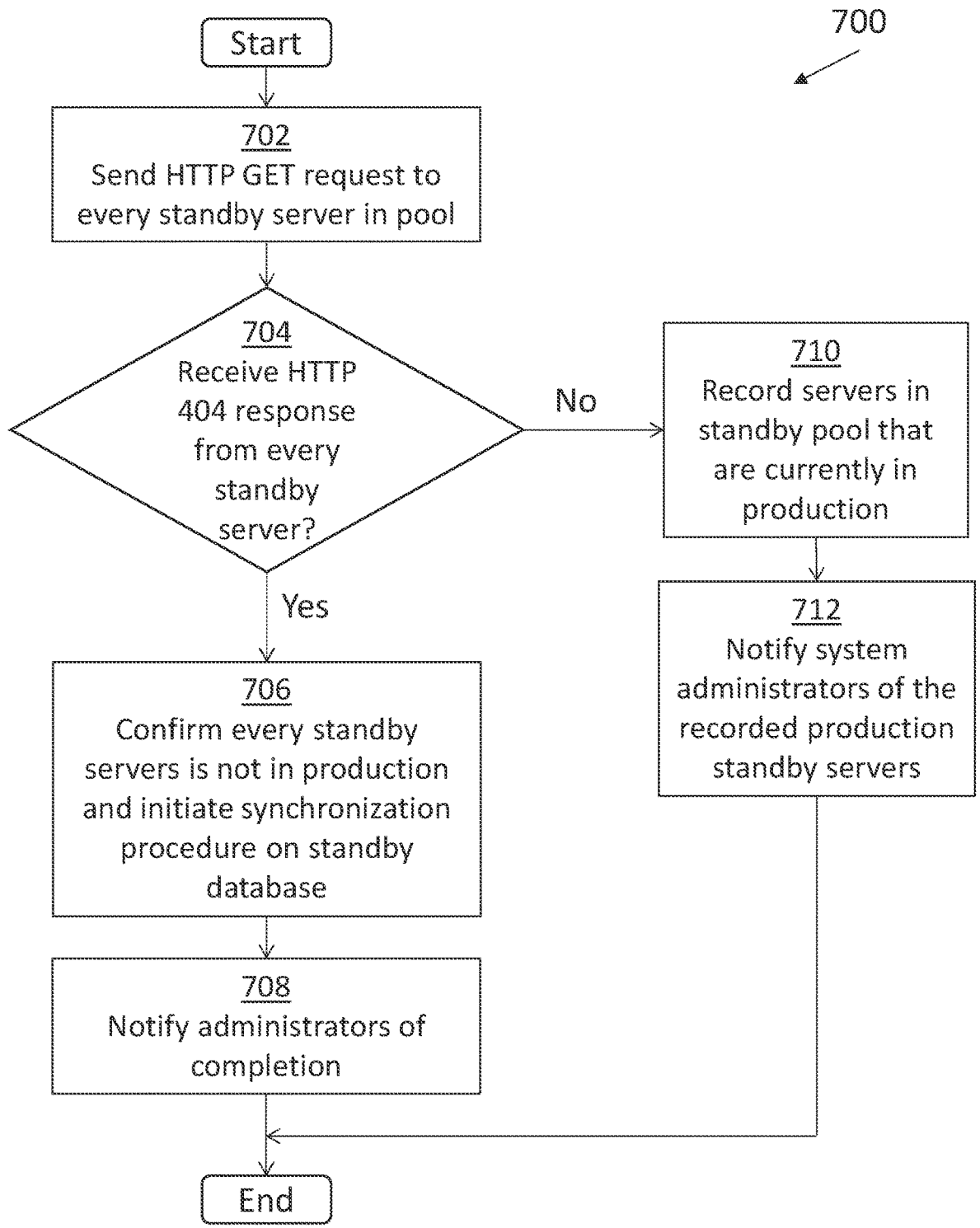
FIG. 7 shows a flowchart for a synchronization method in accordance with one or more embodiments.

According to one or more embodiments, an automated procedure is provided herein for ensuring that standby servers are down before initiating a synchronization operation. The automated procedure for ensuring that every standby server is not in production may be carried out by any number of devices on network 600. For example, the automated procedure may be carried out on one or more of standby servers 606 and 608, with or without assistance from scheduling tool 614. FIG. 7 depicts such an automated procedure 700 in accordance with one or more embodiments, which is known as an automated layer 7 health check. Specifically, FIG. 7 describes a general method for synchronizing an active standby system. One or more blocks in FIG. 7 may be performed by one or more components as described in FIGS. 4-6. While the various blocks in FIG. 7 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

The process begins at step 702, which includes sending HTTP GET requests to every standby server in a standby server pool on the load balancer 410. With reference to FIG. 6, this may include all or more of standby servers 606 and 608. It will be appreciated that an HTTP GET request may be sent to a web server in order to request a web page, portions of a web page, or simply to confirm a positive operating status of the web server. In order to confirm successful operation of the web server, the web server may reply to an HTTP GET request with a 200 OK response. In this embodiment, reception of a 200 OK response confirms that a server is currently active and receiving client requests, regardless of whether it is a production or standby server. If a web server is down or not currently responding to requests, it may return a 404 Not Found response. In this embodiment, the 404 Not Found response means that the server is not currently active and not responding to client requests, regardless of whether it is a production or standby server. The list of servers in the standby server pool may be retrieved by querying load balancer 410 at its VIP address and requesting the list of every IP address belonging to the standby servers in the standby server pool. Alternatively, the list of servers in the standby server pool and their IP addresses may be already known to the system administrators 616 and preprogrammed into redundant network 600, for example into scheduling tool 614.

The method continues at step 704, which asks whether a 404 Not Found response is received from every standby server. If a 404 Not Found response is received from every standby server, then the method continues to step 706, wherein a synchronization operation is initiated between the production and standby databases, for example between production database 610 and standby database 612. The synchronization operation between databases 610 and 612 may be carried out with assistance from one or more of production servers 602 and 604, standby servers 606 and 608, and scheduling tool 614. In one embodiment, one or more of standby servers 606 and 608 may access production database 610 through production servers 602 and 604 in order to update the standby database 612. In another embodiment, one or more of standby servers 606 and 608 may directly access production database 610 in order to update the standby database 612. In yet another embodiment, a series of production logs may be continuously sent between production database 610 and standby database 612, and the synchronization operation may include one or more of standby servers 606 and 608 accessing the production logs to update the standby database 612. In this embodiment, the production logs may contain a catalog of changes made to production database 610, which may contain all the information necessary to update standby database 612.

Next, the method continues to step 708, wherein system administrators 616 are notified of process completion. After this, the process ends. If at step 704 a 404 Not Found response is not received from every standby server, then the process continues to step 710. Typically, it is confirmed that a 404 Not Found response is not received from a standby server when the server returns a 200 OK response. At step 710 every standby server that does not return a 404 Not Found response (or every server that returns a 200 OK response) is recorded as being in production and the process continues at step 712. At step 712, every standby server recorded as being in production in step 710 is notified to the system administrators 616 so that the system administrators 616 may take corrective action. Corrective action may include manually disconnecting the recorded standby servers from the production environment and re-initiating the process. After this, the process ends. It is important to note that synchronization operation 706 does not occur if any of standby servers 606 and 608 indicates that it is in production, for example by sending a 200 OK response. In one embodiment, a server may be recorded as not being in production simply by lack of receiving a 200 OK response. In another embodiment, a server may be recorded as not being in production only after receiving a 404 Not Found response. Consequently, in one or more embodiments, synchronization operation 706 may only occur after receiving a 404 Not Found response from every one of standby server 606 and 608. Further, after completion of process 700, standby servers 606 and 608 may be placed back into production.

In one or more embodiments, step 704 may have one or more timers associated with it. For example, in one embodiment, if a 404 Not Found response is not received from every standby server 606 and 608 within a certain period of time, the process may continue to step 710 where the one or more servers that did not respond are recorded as being in production. The timer may be anywhere from 10 seconds to 5 minutes, for example. In an alternative embodiment, during step 704, if a 200 OK response is not received from one or more of standby servers 606 and 608 within a certain period of time, then the one or more servers that did not response are recorded as not being in production for the purpose of determining whether to proceed to step 706 or step 710. This timer may also be anywhere from 10 seconds to 5 minutes. For instance, at step 704, a 404 Not Found response may be received immediately from standby server 606, but no response may be received from standby server 608 within the certain period of time. In this instance, both servers 606 and 608 are recorded as not being in production, and the process proceeds to step 706.

It will be appreciated that any number of protocols and message types may be employed to carry out the layer 7 health check procedure as outlined above, without departing from the spirit and scope of the invention. For example, where the servers 602-608 are MySQL servers, the layer 7 health check may include sending SHOW DATABASES commands to confirm operational status of the servers. In one or more embodiments, the servers 602-608 may be Apache servers, and the synchronization operation may cause standby servers 606 and 608 to update the standby database 612. Further, the automated layer 7 health check may be initiated manually by a system administrator 616 when it is determined that a synchronization operation needs to occur. Alternatively, a synchronization operation may be pre-scheduled, and the automated layer 7 health check may run automatically prior to initiation of the scheduled synchronization operation.

Figure 8:
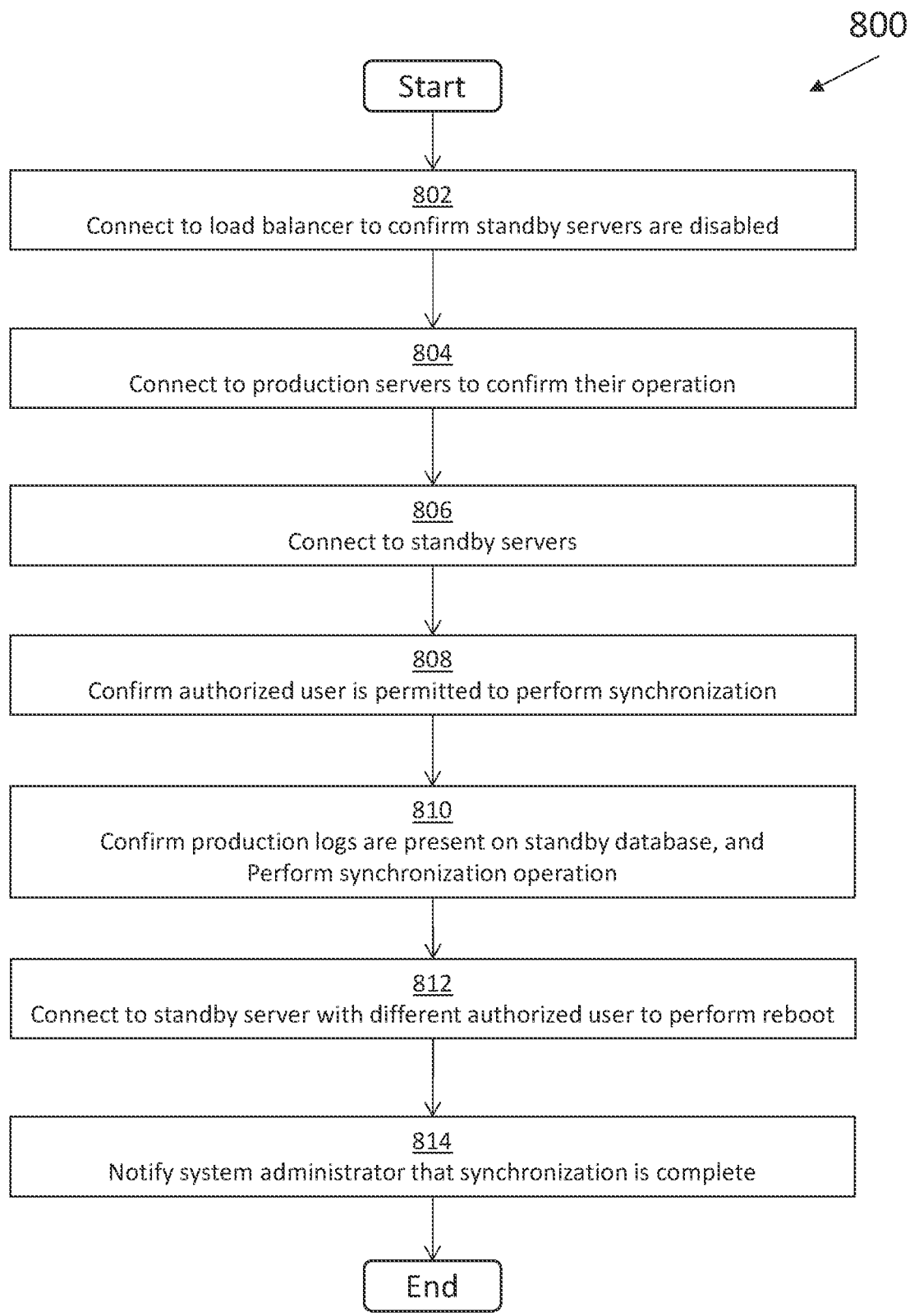
FIG. 8 shows an alternate flowchart for a synchronization method in accordance with one or more embodiments.

FIG. 8 depicts an alternate automated procedure 800 in accordance with one or more embodiments. Specifically, FIG. 8 describes another general method for synchronizing an active standby system. One or more blocks in FIG. 8 may be performed by one or more components as described in FIGS. 4-6. While the various blocks in FIG. 8 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

The process begins at step 802, which includes connecting to the load balancer 410 by an authorized user 618 to confirm that the standby servers 606 and 608 are disabled. This step may include sending one or more HTTP GET requests and monitoring for 200 OK and 404 Not Found responses, as described in detail above. In some embodiments, the process may only proceed to the synchronization operation when receiving a 404 Not Found response from every standby server 606 and 608. Step 802 may further include a health check performed on a custom web page. It will be appreciated that there may be other methods for confirming that none of clients 406 and 408 are currently accessing one or more of standby server 606 and 608 before performing the synchronization operation. Next, the process proceeds to step 804 in which the authorized user 618 connects to production servers 602 and 604 to confirm their operation. Step 804 may be performed to ensure that service is not interrupted to clients 406 and 408. Step 804 may include sending, to all of production server 602 and 604, HTTP GET requests and monitoring for 200 OK and 404 Not Found responses. In some embodiments, step 804 may include requesting a web page from production servers 602 and 604 and confirming that production database 610 is able to be accessed.

Next, the process proceeds to step 806, where the authorized user 618 connects to the standby servers 606 and 608. The process continues at step 808, where it is confirmed whether the authorized user 618 is permitted to perform the synchronization operation. This step may include confirming that authorized user 618 is authorized to connect to standby servers 606 and 608, as well as standby database 612. Step 808 may include confirming a number of access rights or access privileges of authorized user 618. Next, the process proceeds to step 810, where it is confirmed that production logs are present on standby database 612. As described above, the production logs may contain a list of all the changes that have occurred on production database 610 since the last synchronization operation. Further, the production logs may contain all the information necessary to bring standby database 612 up to date. After confirming that the production logs are present, the synchronization operation is performed on standby database 612. The synchronization operation may include copying data directly from the production logs to standby database 612 without accessing production database 610. Alternatively, the synchronization operation may include copying data from production database 610 to standby database 612 according to instruction contained within the production logs.

Next, the process proceeds to step 812, where a different authorized user 618 connects to standby server 606 and 608 in order to perform a reboot. This step may include rebooting or re-initializing one or more of standby servers 606, 608 and standby database 612. Finally, the process proceeds to step 814 where the system administrator 616 is notified of the completed synchronization operation. After this, the process ends.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method for performing a synchronization operation, the method comprising:
   retrieving a list of network addresses of all standby servers in a standby server pool;
   using the list of network addresses, sending a health check query to each standby server in the standby server pool;
   receiving response messages from the standby servers in the standby server pool;
   wherein a positive response from a standby server indicates that the standby server is active in the standby server pool;
   wherein a negative response from a standby server indicates that the standby server is inactive in the standby server pool;
   when any standby server returns the positive response, sending a message to a system administrator indicating every server that returns the positive response; and
   when every standby server returns the negative response, initiating a synchronization operation on a standby database connected to the standby servers.

2. The method of claim 1, wherein the health check query comprises an HTTP GET request.

3. The method of claim 2, wherein the positive response is an HTTP 200 OK response and the negative response is an HTTP 404 Not Found response.

4. The method of claim 1, wherein the list of network addresses comprises a list of internet protocol (IP) network addresses that are associated with a load balancer having a virtual internet protocol (VIP) address.

5. The method of claim 1, wherein the synchronization operation comprises synchronizing data between the standby database and a production database.

6. The method of claim 1, wherein the synchronization operation is initiated by a first authorized user, and the method further comprises:
   upon completion of the synchronization operation, rebooting the standby servers by a second authorized user.

7. A non-transitory computer-readable storage media having computer-readable instructions stored thereon, which when executed by a computer cause the computer to perform the method comprising:
   access a list of network addresses of all standby servers in a standby server pool;
   using the list of network addresses, send a health check query to each standby server in the standby server pool;
   receive response messages from the standby servers in the standby server pool;
   wherein a positive response from a standby server indicates that the standby server is active in the standby server pool;
   wherein a negative response from a standby server indicates that the standby server is inactive in the standby server pool;
   when any standby server returns the positive response, send a message to a system administrator indicating every server that returns the positive response; and
   when every standby server returns the negative response, initiate a synchronization operation on a standby database connected to the standby servers.

8. The non-transitory computer-readable storage media of claim 7, wherein the health check query comprises an HTTP GET request.

9. The non-transitory computer-readable storage media of claim 8, wherein the positive response is an HTTP 200 OK response and the negative response is an HTTP 404 Not Found response.

10. The non-transitory computer-readable storage media of claim 7, wherein the list of network addresses comprises a list of internet protocol (IP) network addresses that are associated with a load balancer having a virtual internet protocol (VIP) address.

11. The non-transitory computer-readable storage media of claim 7, wherein the synchronization operation comprises synchronizing data between the standby database and a production database.

12. The non-transitory computer-readable storage media of claim 7, wherein the synchronization operation is initiated by a first authorized user, and the method further comprises:
   upon completion of the synchronization operation, rebooting the standby servers by a second authorized user.

13. A computer network comprising:
   at least one first computer; and
   one or more standby servers in a standby server pool,
   wherein the first computer is configured to:
   access a list of network addresses of all the standby servers in the standby server pool;
   using the list of network addresses, send a health check query to each standby server in the standby server pool,
   receive response messages from the standby servers in the standby server pool,
   wherein a positive response from a standby server indicates that the standby server is active in the standby server pool,
   wherein a negative response from a standby server indicates that the standby server is inactive in the standby server pool,
   when any standby server returns the positive response, send a message to a system administrator indicating every server that returns the positive response, and
   when every standby server returns the negative response, initiate a synchronization operation on a standby database connected to the standby servers.

14. The computer network of claim 13, wherein the health check query comprises an HTTP GET request.

15. The computer network of claim 14, wherein the positive response is an HTTP 200 OK response and the negative response is an HTTP 404 Not Found response.

16. The computer network of claim 13, wherein the list of network addresses comprises a list of internet protocol (IP) network addresses associated with a load balancer having a virtual internet protocol (VIP) address.

17. The computer network of claim 13, wherein the synchronization operation comprises synchronizing data between the standby database and a production database.

18. The computer network of claim 13, wherein the synchronization operation is initiated by a first authorized user, and the first computer is further configured to:
   upon completion of the synchronization operation, reboot the standby servers by a second authorized user.

* * * * *